United States Patent
Fosburgh et al.

(10) Patent No.: US 10,204,388 B2
(45) Date of Patent: Feb. 12, 2019

(54) METHOD, SYSTEM, AND MEDIUM OF CONSTRUCTION PROJECT MANAGEMENT

(71) Applicant: Trimble Inc., Sunnyvale, CA (US)

(72) Inventors: Bryn Fosburgh, Longmont, CO (US); Rosalind Buick, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 1241 days.

(21) Appl. No.: 13/866,409

(22) Filed: Apr. 19, 2013

(65) Prior Publication Data
US 2014/0316837 A1 Oct. 23, 2014

(51) Int. Cl.
*G06Q 50/08* (2012.01)
*G06Q 10/06* (2012.01)

(52) U.S. Cl.
CPC ....... *G06Q 50/08* (2013.01); *G06Q 10/06312* (2013.01)

(58) Field of Classification Search
CPC .................................................. G06Q 50/08
See application file for complete search history.

(56) References Cited

U.S. PATENT DOCUMENTS

| | | | |
|---|---|---|---|
| 5,404,661 A * | 4/1995 | Sahm | E02F 3/427 37/347 |
| 6,236,924 B1 | 5/2001 | Motz et al. | |
| 2003/0052877 A1 * | 3/2003 | Schwegler, Jr. | G06F 17/5004 345/420 |
| 2006/0174239 A1 * | 8/2006 | Dietsch | G06Q 10/06 717/169 |
| 2007/0244671 A1 * | 10/2007 | Iyangar | G06Q 10/10 703/1 |

(Continued)

FOREIGN PATENT DOCUMENTS

| | | |
|---|---|---|
| CN | 1117317 A | 2/1996 |
| CN | 1380921 A | 11/2002 |

(Continued)

OTHER PUBLICATIONS

Chevron San Ardo to Coalinga Heated Oil Pipeline Project Draft Environmental Impact Report, County of Montery, County of Fresno, vol. 1 Cover, Table of Contents, Section 3.6, http://www.co.fresno.ca.us/DepartmentPage.aspx?id=12761.*

(Continued)

*Primary Examiner* — Kurtis Gills
*Assistant Examiner* — Akosua Kyereme-Tuah
(74) *Attorney, Agent, or Firm* — Kilpatrick Townsend & Stockton

(57) ABSTRACT

A method of construction project management is disclosed. In one embodiment, parameters of a construction project design are provided to an asset at a construction site. Geospatial information is then collected by the asset while the asset is implementing parameters of the construction project design at the construction site. The geospatial information is provided to a construction management computing system in real-time. The construction management computing system is remote from the asset. Progress on the construction site design is then dynamically updated in real-time by the construction management computing system based on the geospatial information to create a real-time, as constructed model of the construction project.

53 Claims, 7 Drawing Sheets

(56) References Cited

U.S. PATENT DOCUMENTS

| | | | |
|---|---|---|---|
| 2009/0210277 A1 | 8/2009 | Hardin et al. | |
| 2012/0116728 A1* | 5/2012 | Shear | G06F 17/50 703/1 |
| 2012/0310444 A1* | 12/2012 | Fitch | E02F 3/786 701/2 |

FOREIGN PATENT DOCUMENTS

| | | |
|---|---|---|
| CN | 101124524 A | 2/2008 |
| JP | 2007-164741 A | 6/2007 |
| JP | 2007164741 A | 6/2007 |
| WO | 2002029518 | 4/2002 |

OTHER PUBLICATIONS

City of Burbank, 2009, Removal of Underground Storage Tanks containing harzadous materials, Mar. 18, 2009, http://www.burbankfire.us/home/showdocument?id=237 (Year: 2009).*

International Search Report for Application No. PCT/US2014/034657 dated Mar. 17, 2015, 3 pages.

Written Opinion for Application No. PCT/US2014/034657 dated Mar. 17, 2015, 6 pages.

International Preliminary Report on Patentability for Application No. PCT/US2014/034657 dated Oct. 20, 2015, 7 pages.

* cited by examiner

700

PROVIDING PARAMETERS OF A CONSTRUCTION PROJECT DESIGN TO AN ASSET AT A CONSTRUCTION SITE
710

COLLECTING GEOSPATIAL INFORMATION WITH THE ASSET WHILE IMPLEMENTING PARAMETERS OF THE CONSTRUCTION PROJECT DESIGN AT THE CONSTRUCTION SITE
720

PROVIDING THE GEOSPATIAL INFORMATION TO A CONSTRUCTION MANAGEMENT COMPUTING SYSTEM IN REAL-TIME
730

DYNAMICALLY UPDATING PROGRESS ON THE CONSTRUCTION SITE DESIGN IN REAL-TIME BASED ON THE GEOSPATIAL INFORMATION TO CREATE A REAL-TIME AS-CONSTRUCTED MODEL OF THE CONSTRUCTION PROJECT, THE UPDATING PERFORMED BY THE CONSTRUCTION MANAGEMENT COMPUTING SYSTEM
740

FIG. 7

METHOD, SYSTEM, AND MEDIUM OF CONSTRUCTION PROJECT MANAGEMENT

BACKGROUND

In current construction practice, many professions are integrated in order to bring a project to completion. However, these professions are integrated in a linear process which separates activities by profession, rather than integrate them. This is especially problematic in the exchange of data. For example, during a construction project the architect or engineer will make a set of plans for a project which are then passed on to the contractor who actually builds the project. Often, the contractor will have to make on-the-spot modifications to these plans. However, these modifications often require lengthy measurement, reporting, and revision of existing plans which is error prone and may not be properly distributed back to the assets in the field so that everyone working on the project is working with the same up to date version of the plans. Stand-alone devices can be self-aware in the sense that operations performed by that device can be stored locally. However, there is no provision for pushing updates to update a master plan or to update other devices regarding any operations which have been performed.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

FIG. 7 is a flowchart of a method of construction project management in accordance with various embodiments.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "providing," "collecting," "updating," "using," "estimating," "comparing," "determining," "revising," "creating," "implementing," "sending," or the like, often (but not always) refer to the actions and processes of a computer system or similar electronic computing device. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Information Management Network

Figure 1:
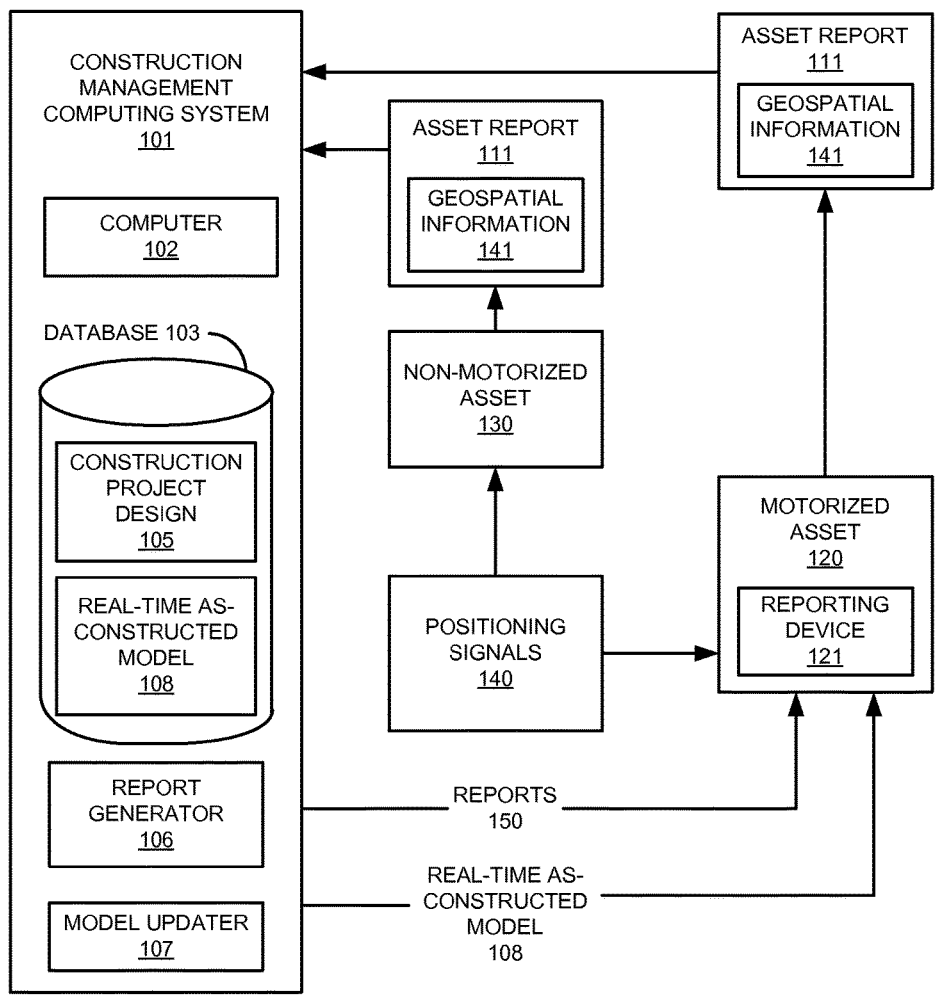
FIG. 1 is a block diagram of an information management network in accordance with various embodiments.

FIG. 1 shows an information management network 100 in accordance with an embodiment. In FIG. 1, a construction management computing system 101, comprising computer 102 and database 103, stores a construction project design 105 in database 103. In accordance with various embodiments, construction management computing system 101 comprises a computing system which is remote from the reporting sources in the field (e.g., motorized asset 120 and/or non-motorized asset 130 of FIG. 1) which are generating reports (e.g., asset reports 1110 of FIG. 1). In other words, construction management computing system 101 is not located on, or a component of, the reporting asset (e.g., motorized asset 120 and/or non-motorized asset 130 of FIG. 1) which is generating an asset report. In a typical process for planning a construction project, numerous studies and reports are generated before construction begins. As an example, a feasibility study for a public transportation project would likely examine how many people would use the transportation, the approximate cost of the project, including any infrastructure needed during the construction process as well as after completion, as well as right-of-way issues involved in the project. Also, environmental impact studies, historical/cultural reports, and land use reports are likely to be required before permission for the project is granted. All of this information is used to determine a desired path for the transportation project based upon the factors cited above. After the location for the project has been determined, the site is physically surveyed using ground-based, aerial, or satellite-based sensors to determine the existing terrain conformation at the site.

Once the survey of the site has been performed, it can be determined which earthworks operations have to be performed to attain the correct site conformation to complete the construction project. This may include cut-and-fill operations as well as bring in, or taking away, materials to the site, compaction, and features such as culverts and ditches to achieve the desired terrain conformation for the construction project as well as other built structures. For example, how many cubic meters of fill must be brought in, or moved from a cut, what equipment is needed, how many man-hours are required, etc. are all factors that are considered in the planning process. Based upon this information, estimates of the cost and time for completing the project are generated based upon the difference between the existing terrain conformation and the desired final project. Based on all of this information, construction project design 105 is then generated. Construction project design 105 therefore comprises not only a plan of the initial and final terrain conformation (e.g., also including built structures), but can also include schedules, lists and sequences of tasks to be performed, delivery schedules, labor and equipment requirements, budgets, time to completion, and performance metrics which are used during the process of completing the construction project. Alternatively, construction project design 105 can be the starting point from which changes are made during the planning process. Thus, results from environmental impact studies, historical/cultural reports, land use reports, and the like can be used to update construction project design 105. Then, parameters for operations and tasks to complete construction project design 105 are generated. Examples of Computer Aided Design (CAD) programs used to generate construction product design 105, and real-time as-constructed model 108, include, but are not limited to, software by AutoCAD®, SketchUP, and Bentley. In accordance with various embodiments, construction management computing system 101 can be implemented as a stand-alone device, a networked computer system, a datacenter, or in a Cloud-computing based environment.

In accordance with various embodiments, construction management computing system 101 receives asset information (e.g., asset report 111) from a motorized asset 120 and/or 130 during the process of implementing construction project design 105. In the example of FIG. 1, motorized asset 120 comprises a motorized asset equipped with a reporting device 121 which generates asset reports 111. Using the information conveyed in the asset reports 111, construction management computing system 101 then updates the data from construction project design 105 using model updater 107 to create a real-time, as-constructed model 108 of the construction project which is stored in database 103. In accordance with one embodiment, construction project design 105 is separately retained intact while real-time as-constructed model 108 is continuously updated in real-time based upon asset reports 111. In response to user requests, in response to the occurrence of a defined event, or automatically based upon a pre-determined time interval, construction management computing system 101 generates reports 150 which can update assets (e.g., 120) in the field regarding current or upcoming tasks, or to provide information regarding the progress of the construction project. In one embodiment, each time an asset report 111 is received by construction management computing system 101, a new report 150 is generated to facilitate updating in real-time the data to assets 120 in the field. In accordance with various embodiments, reports 150 comprise operation project management parameters conveying how to manage materials, labor, equipments, etc. and can include geospatial information (e.g., in 2-dimensions, or more) and instructions on a next operation to be performed by an asset. Report 150 can include what time a task is to be performed, a sequence of events for optimal execution of a task or a particular piece of equipment to be used to perform a task. This geospatial information can be linked to an instance of real-time as-constructed model 108. Similarly, assets 120 and 130 can generate asset report 111 in response to requests from construction management computing system 101, in response to the occurrence of a defined event, or automatically based upon a pre-determined time interval. In general, reports 150 comprise data, warnings, or other messages which assist in the completion of a task, for reporting progress of a task or project, or parameters for implementing a construction project design.

In accordance with one embodiment, database 103 can store and retrieve task data comprising parameters of tasks which are to be performed to execute construction project design 105 and use that data to generate reports 150. However, based upon the current terrain conformation as reflected in real-time as-constructed model 108, these tasks can be modified in real-time by construction management computing system 101. For example, if an area of a construction site is described by construction project design 105 as being filled with 10,000 cubic meters of fill, and real-time as-constructed model 108 shows that only 2,000 cubic meters of fill have been emplaced, construction management computing system 101 can determine that 8,000 cubic meters of fill remain to be emplaced. This data can then be sent in the form of reports 150 to various assets in the field in real-time to change the parameters of the task to reflect current conditions. It is noted that reports 150 can be sent to various devices such as laptop computers, tablet computers, personal digital assistants, or other display devices to keep personnel at the construction site appraised as to the progress of the project. Reports 150 can also be sent to other computer systems either on-site or offsite used for monitoring, supervision, or reporting of the progress of the construction project.

The reports 150 can be used to convey the parameters of the task to be performed such as the position where the task is to be performed, operating parameters when performing the task, alerts, updated scheduling information, etc. to an asset at the construction site. For example, with reference to FIG. 2, report 150 may comprise a data file (e.g., a computer-aided design (CAD) file, or other type of data file) conveying construction parameters to a motorized asset 120 at a construction site 200.

Figure 2:
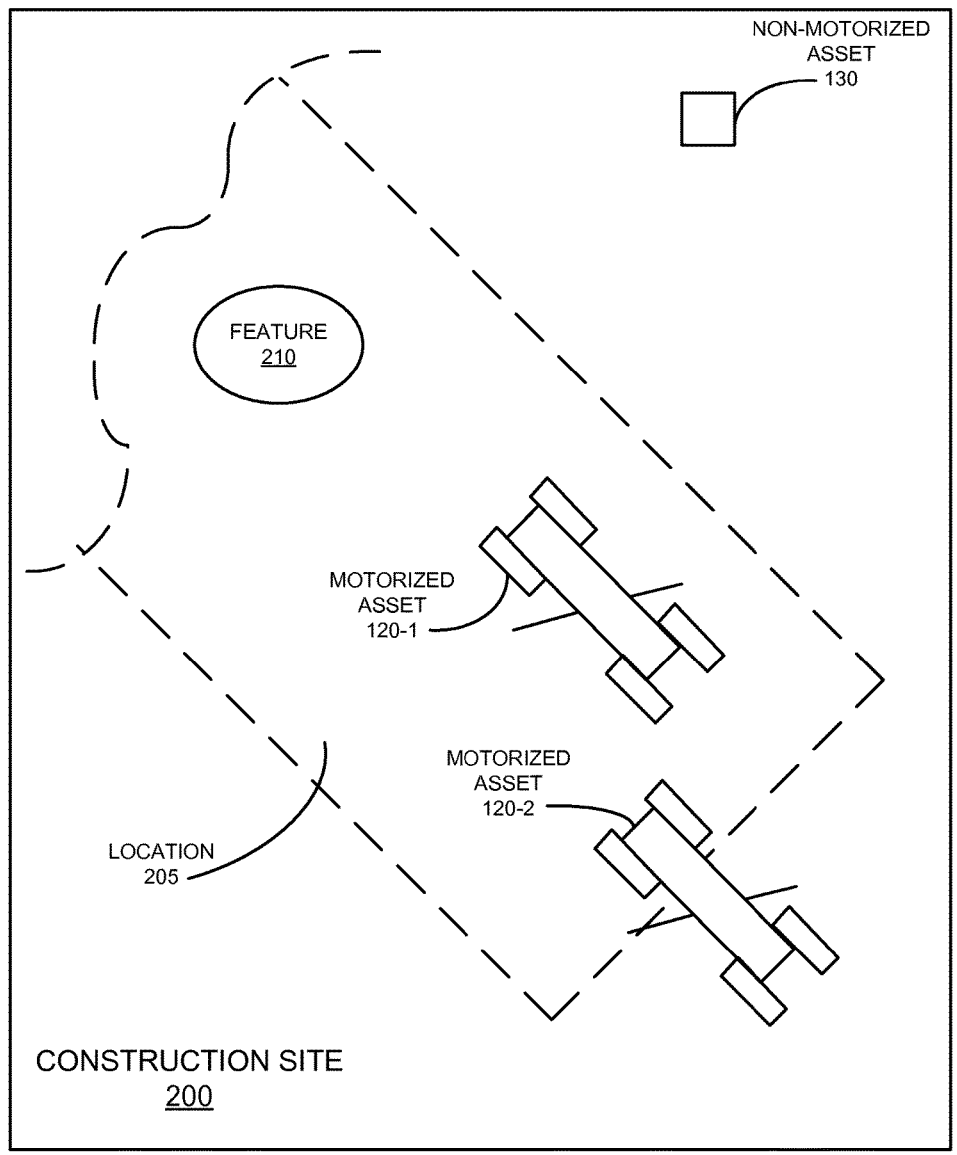
FIG. 2 shows an example construction site in accordance with various embodiments.

FIG. 2 shows a location 205 within a construction site 200 where a motorized asset 120-1 (e.g., a grader) is to remove soil to a desired height. In accordance with various embodiments, motorized asset 120-1 is configured to collect and report geospatially-aware information 141 while performing tasks which is conveyed in asset report 111 to construction management computing system 101. For example, while removing the soil from location 205, motorized asset 120 can simultaneously collect geospatial information 141 which provides an indication of how much soil motorized asset 120-1 has removed. This data is conveyed in asset report 111 to construction management computing system 101 in real-time to facilitate updating construction project design 105. In various embodiments, assets 120 comprise motorized assets such as vehicles at construction site 200 which are configured to receive positioning signals 140. For example, assets 120-1 and 120-2 of FIG. 2 can be equipped with a positioning system (e.g., an Global Navigation Satellite System (GNSS) receiver) which may be configured to receive signals from a Global Navigation Satellite System (GNSS), and/or a terrestrial-based positioning system, and/or a locally emplaced pseudolite (not shown). In various embodiments, motorized assets can include construction equipment such as trucks, bulldozers, graders, scrapers, front-end loaders, or the like in which the distance between an antenna used to receive positioning signals 140 and the ground is known. Alternatively, the distance between the antenna used to receive positioning signals 140 and the working end of a device disposed on a vehicle (e.g., the working end of a blade of a bulldozer) can be known in various embodiments. Using this information, as well as received positioning signals 140 (e.g., positioning signals from satellite-based or terrestrial-based positioning systems, pseudolites, etc.) assets 120-1 and 120-2 can convey geospatial information 141 in asset reports 111 which accurately convey the current terrain conformation (e.g., the elevation of the ground over which assets 120-1 and 120-2 are travelling) to construction management computing system 101. Construction management computing system 101 can then generate a terrain map in real-time which indicates the current terrain conformation at construction site 200.

In various embodiments, the processing of geospatial information 141 can be performed by either of motorized asset 120 and/or construction management computing system 101. For example, in one embodiment, motorized asset 120 simply reports positioning data (e.g., raw observables from positioning signals 140, or processed position data) to construction management computing system 101. Construction management computing system 101 uses the known distance between the antenna used by motorized asset 120 to receive positioning signals and the ground to determine the current terrain conformation at construction site 200. Alternatively, this processing can be performed at motorized asset 120 such that the current terrain conformation along a route traveled by motorized asset 120 is conveyed in asset report 111. It is noted that a plurality of asset reports 111, each conveying respective geospatial information 141 can be sent by motorized asset 120 as it travels along a route. It is noted that assets 120 are not required to be construction vehicles and can comprise any vehicle equipped to receive geospatial information. For example, a site supervisor can use a pickup truck or all-terrain vehicle (ATV) to travel from location to location within construction site 200. If this vehicle is equipped to receive and report geospatial information 141, this data may be conveyed in asset report 111. In at least one embodiment, it may be beneficial to equip as many vehicles as possible to generate asset reports 111 to generate as many data points as possible to create and update real-time as-constructed model 108. For example, dump trucks, or water trucks used to spray water in order to reduce dust in a construction site, can be equipped with positioning receivers and used to generate geospatial information 141 which is reported to construction management computing system 101. Thus, as motorized assets 120 move around construction site 200, they are constantly generating data providing an instantaneous view of the current terrain conformation which can be used to continuously update real-time as-constructed model 108.

In accordance with various embodiments, assets 130 comprise non-motorized assets such as, but not limited to, data recorders, surveying stations, or the like which are configured to receive positioning signals 140 and generate geospatial information 141 in respective asset reports 111. For example, surveying stations are often emplaced at construction sites to precisely locate where features or structures are to be emplaced, or to verify that a given task has been performed in accordance with given parameters. Alternatively, Geographic Information System (GIS) recorders can be used to capture geographically referenced data at a site. In accordance with various embodiments, geospatial information 141 from non-motorized assets 130 can also be used to update real-time as-constructed model 108. In accordance with various embodiments, as long as the distance from the antenna of a non-motorized asset 130 to the ground is known, the position of non-motorized asset 130 can be used as geospatial information 141 which is reported to construction management computing system 101. Additionally, sometimes during a construction project, unanticipated features (e.g., feature 210 of FIG. 2) are encountered which must be reported. For example, if a culturally sensitive site (e.g., an archaeological site, an anthropological site, etc.) is uncovered during a project, that site may have to be recorded, and reported to various authorities. In another example, if an underground petroleum tank is uncovered, its position will likewise be recorded by a non-motorized asset 130 (e.g., by a surveying station, or GNSS position reporter) for proper reporting. In this example, removal of the tank, as well as surrounding soil, will have to be accomplished and the resulting hole filled. In such an instance, it may be necessary or desirable to re-route or change the original plan for the project around feature 210 rather than wait for these operations to be reported, approved, and performed.

In some instances, rather than wait for proper excavation of feature 210, or because further construction near the location of feature 210 is prohibited, real-time as-constructed model 108 will be adjusted to reflect that a location encompassing feature 210 is off-limits. This may require adjustments in construction project design 105 to re-route, or move features which are to be built on construction site 200. Thus, real-time as-constructed model 108 can be quickly updated to reflect the current status of construction site 200 rather than waiting for separate steps of recording, reporting, and updating of construction plans which in the past were implemented using separate professions. As described above, the use of separate professions in a substantially linear task process results in slower, more error prone exchange of construction data. However, in accordance with various embodiments, multiple assets are conveying geospatial information in real-time to construction management computing system 101 which permits updating real-time as-constructed model 108 to reflect current conditions at construction site 200. In accordance with one embodiment, changes can be made to construction project design 105 to account for the unanticipated conditions encountered during the construction process. This in turn will change tasks, schedules, an estimates previously generated in the design process. As a result, report generator 106 can be used to generate new reports, including new parameters for tasks involved in the completion of the construction project. This may include altering time and cost estimates, delivery schedules, re-routing traffic on construction site 200, designating feature 210 as a protected site to prevent damage to feature 210, or to properly remove feature 210 as necessary. In another example, it may be desired to change the radius of a curve on a highway due to aesthetics, geological conditions, cultural/historic artifacts, or the like.

In accordance with one embodiment, construction management computing system 101 uses model updater 107 to dynamically update construction project design 105 based upon the data from asset report 111 to create real-time as-constructed model 108 of construction site 200. In other words, whatever changes are made at construction site 200 are reported in real-time and used to update construction project design 105 so that the actual terrain conformation of construction site 200 is known and can be reported out to assets in the field, or used to generate reports or other metrics for construction project management. In one embodiment, reports 150 can convey a completion level of construction project design 105. In various embodiments, a comparison of one of the construction parameters of construction project design 105 with a second value indicating how much of that parameter has been performed by construction management computing system 101 to determine how much of that construction project parameter has been completed, or remains to be done. For example, if one of the construction project parameters is that 10,000 cubic meters of dirt is to be removed from a location of a construction site, and only 6,000 cubic meters have been moved, construction management computing system 101 can make a comparison of these figures to determine that that particular task is 60% completed, or that 40% of that task remains to be done. This information can be used to update time, task, cost, manpower, or equipment estimates of the construction project as well. This is a useful metric during the construction process not only for the contractor performing the construction project, but also for reporting out to private or public oversight as to the progress of the construction project. As an example, in some instances the contractor is paid based upon work already performed. Thus, by using construction management computing system 101, the contractor can accurately report the amount of progress made in the construction project to secure more funding.

In accordance with various embodiments, construction management computing system 101 can also generate additional reports 150 to assets 120 in the field so that they can update their task parameters, or a locally stored copy of real-time as-constructed model 108. Alternatively, in one embodiment, construction management computing system 101 can convey the updated real-time as-constructed model 108 in its entirety to assets 120 in the field. It is noted that reports 150 comprise revised parameters of the construction project based upon received asset reports 111, in various embodiments. For example, an asset report 111 from motorized asset 120-1 may indicated that 60 centimeters of soil were removed from location 205 on a first pass while the task to be performed is to remove 1 meter of soil from location 205. In accordance with various embodiments, reports 150 can convey to motorized asset 120-1 that additional passes are required to remove 40 centimeters of soil from location 205. In various embodiments, reports 150 can convey this information to other assets (e.g., motorized asset 120-2 of FIG. 2) which may also be working in conjunction with motorized asset 120-1. Thus if assets 120-1 and 120-2 are making successive passes over location 205 to remove 1 meter of dirt from that location, reports 150 update the job parameters performed by those assets in real-time as to the progress of that particular task. Thus, after a first pass by motorized asset 120-1, motorized asset 120-2 receives a report 150 indicating that 60 centimeters of dirt has been removed by motorized asset 120-1. The operator of motorized asset 120-2 can then adjust the depth of soil removal so that 40 centimeters of soil are removed from location 205 when motorized asset 120-2 makes a pass. Thus, the parameters passed onto to assets 120-1 and 120-2 are based upon the real-time as-constructed model 108. This rapid reporting and dissemination of data facilitates completing a task more quickly and precisely. In another embodiment, reports 150 and/or real-time as-constructed model 108 can be from one asset to another in a peer-to-peer network.

In accordance with various embodiments, asset reports 111 can convey geospatial information 141 as well as other data such as, but limited to, the completion of a task, time spent in performing a task, site conditions, alerts, or the like to construction management computing system 101. In one embodiment, site conditions at construction site 200 may necessitate updating real-time as-constructed model 108 to account for unanticipated conditions. For example, if assets 120-1 and 120-2 encounter soil or terrain for which they are not well suited (e.g., rocky soil) they can indicate this condition to construction management computing system 101. Construction management computing system 101 can update real-time as-constructed model 108 to indicate that additional operations are necessary (e.g., blasting), or that other equipment (e.g., a bulldozer) is better suited to complete the task. This updating of real-time as-constructed model 108 can include revising estimates to reflect additional materials or skilled operators needed to complete a task, or additional implements/equipment needed to complete the task, or are no longer required. As a result, unneeded implements can be sent back to a storage facility or rental company while needed implements can be retrieved from a storage facility or rented. In accordance with various embodiments, construction management computing system 101 can generate an updated mass haul plan based upon the asset reports 111 it has received from motorized assets 120 and/or non-motorized assets 130.

In accordance with various embodiments, real-time as-constructed model 108 is a multi-dimensional model which can convey and report parameters of construction site 200 in a variety of ways. For example, real-time as-constructed model 108 can be conveyed as a series of layers of construction site 200. Thus, there may be one or more subsurface layers which are 2-dimensional representations of construction site 200. There can also be one or more 2-dimensional layers showing surface level, or multi-level, representations of construction site 200. Real-time as-constructed model 108 can also be conveyed as a 3-dimensional model of construction site 200. In addition to the 3-dimensional model, extra dimensions such as time, cost, and percentage of task completed, etc. can be added to provide n-dimensional representation of construction site 200. It is noted that for the purpose of the present application, the term "3-dimensional" is understood to mean at least an X an Y spatial dimension (e.g., latitude and longitude) as well as another dimension. This third dimension can comprise a third spatial dimension (e.g., a Z axis such as elevation) or another non-spatial parameter. Examples of non-spatial parameters which can be used as a third dimension include, but are not limited to, time, cost, mass of earthworks hauled, volume of earthworks hauled, truckloads of earthworks hauled, number of bucket loads moved, etc. Furthermore, it is anticipated that not every asset at a site will report all of the same information back to construction management computing system 101. For example, a motorized asset 120, such as a dump truck, may report 2-dimensional geospatial information 141 as well as a volume, load, or weight of earthworks which are deposited at a particular location of a construction site. Another motorized asset 120, e.g., a scraper, may report 3-dimensional geospatial information 141 comprising the latitude, longitude, and elevation of the working end of its blade in order to report the level of a roadway being built. A third motorized asset 120, e.g., an excavator, may report 2-dimensional geospatial information 141 as well as the number of bucket loads removed from a location of the construction site. In accordance with various embodiments, construction management computing system 101 is configured to aggregate these different types of data into real-time as-constructed model 108. In accordance with various embodiments, this information can be used to create "theoretical elevations" of the construction site. As an example, knowing what volume of dirt has been removed from a given location of a construction site can facilitate extrapolating what the elevation now is at that location. Similarly, knowing the current elevation after an operation has been performed facilitates generating an estimate of the volume, mass, or number of truckloads of earthworks that has been moved from a particular location of a construction site. In other words, construction management computing system 101 is not limited to elevation data alone in determining the current terrain conformation at a construction site. In accordance with various embodiments, a plurality of multi-dimensional models of the construction site can be created. Thus, a 2-dimensional geospatial model of the construction site, a 3-dimensional geospatial model of the construction site, as well as non-spatial parameters described above, can be aggregated to create real-time as-constructed model 108. Again, this data can be stored as separate layers which can be sent separately, or aggregated.

In addition, real-time as-constructed model 108 permits quickly determining deviations in the as-constructed conformation of a construction site from construction project design 105. As an example, if a curve in a road in some manner deviates from the planned curve that is described in construction project design 105, construction management computing system 101 can readily determine this deviation and generate a report 150 notifying a supervisor or operator of the deviation so that corrective action can be taken. Alternatively, if the deviation from construction project design 105 is approved of, construction management computing system 101 can quickly update real-time as-constructed model 108 to reflect the current terrain conformation. Also, as described above, construction management computing system 101 can determine how much more work has to be done to finish a given task by comparing construction project design 105 with real-time as-constructed model 108.

Example Motorized Asset

Figure 3A:
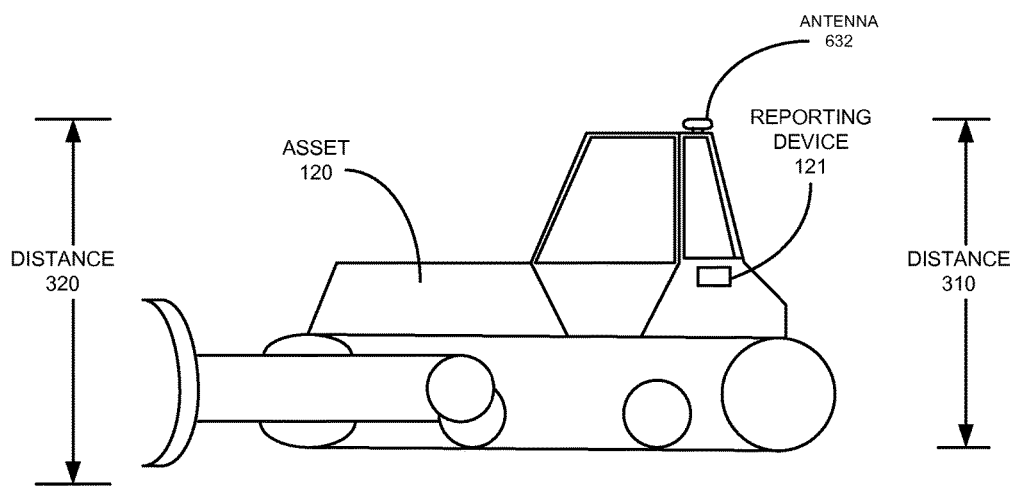
FIG. 3A shows an example motorized asset in accordance with various embodiments.

FIG. 3A shows an example motorized asset 120 in accordance with various embodiments. In FIG. 3A, motorized asset 120 comprises a bulldozer which is configured with a reporting device 121 an antenna 632 which is described in greater detail with reference to FIG. 6. As described above, various embodiments used the known distance (e.g., 310 of FIG. 3A) between antenna 632 and ground beneath the wheels, or treads, of the vehicle to determine the terrain conformation. For example, as motorized asset 120 traverses construction site 200, it can take periodic position fixes based upon positioning signals 140. In one embodiment, GNSS receiver 600 is configured to determine a three dimensional position fix for motorized asset 120 based upon positioning signals from 4 or more navigation satellites. Using the knowledge of the distance 310 between antenna 632 and ground beneath the wheels of motorized asset 120, the elevation of the terrain which motorized asset 120 is traversing can be determined. It is noted that this operation can either be performed by reporting device 121, or by construction management computing system 101. Alternatively, the distance (e.g., 330 of FIG. 3A) between antenna 632 and the working end of an implement of motorized asset 120 can be similarly used to determine the elevation of terrain which motorized asset 120 is traversing.

Example Reporting Device

Figure 3B:
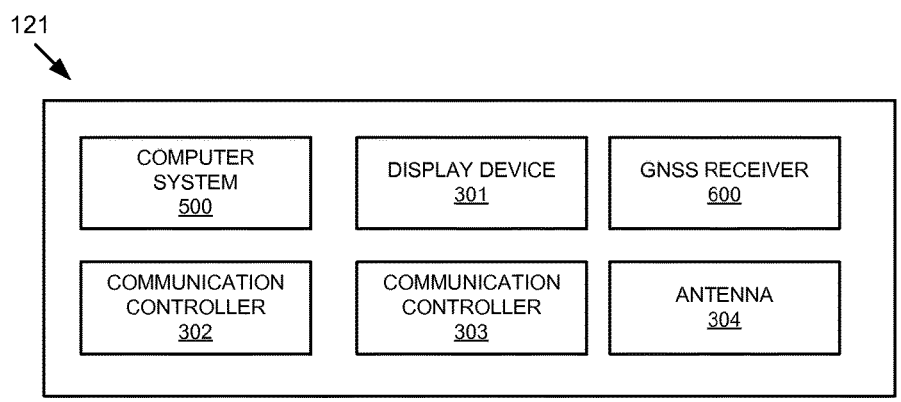
FIG. 3B shows components of an example motorize in accordance with various embodiments.

FIG. 3B is a block diagram of an example reporting device 121 in accordance with one or more embodiments. In FIG. 3B, reporting device 121 comprises a computer system 500 which is discussed in greater detail below with reference to FIG. 5. It is noted that all of the functionality of computer system 500 may not be needed, or would be redundant when utilized in reporting device 121. Reporting device 121 further comprises a GNSS receiver 600 which is discussed in greater detail below with reference to FIG. 6. In FIG. 3B, reporting device 121 further comprises a display device 301 which is configured to display, for example, navigation data from GNSS receiver 600 as well as instructions/parameters of tasks as conveyed in reports 150 of FIG. 1. In FIG. 3B, reporting device 121 further comprises communication controllers 302 and 303.

Communication controllers 302 and 303 provide communications with construction management computing system 101 as well as other assets or computing systems which may be located at construction site 200. It is noted the communication controllers 302 and 303 can be one or more of a transmitter, a receiver, or a transceiver in accordance with various embodiments. As an example, in one embodiment communication controller 302 and/or 303 may be configured to operate on any suitable wireless communication protocol including, but not limited to: WiFi, WiMAX, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard). Personal area networks refer to short-range, and often low-data-rate, wireless communications networks. In one or more embodiments, communication controllers 302 and 303 may both be configured to communicate using the wireless communication protocols listed above. It is understood that communication controllers 302 and 303 may be separate devices, may be dedicated hardware within another device, may be implemented in computer readable instructions, or may comprise a combination of such techniques. In accordance with various embodiments, communication controllers 302 and 303 may be configured for automatic detection of other components and for automatically establishing communications. Alternately, communication controllers 302 and 303 may be preconfigured for communicating with other components or can implement manual configuration of components for communicating with other components. In one embodiment, reporting device 121 only uses communication controller 302 to communicate with construction management computing system 101. For communication with other assets or computing systems located at construction site 200 communications controller 303 is used. Thus, reporting device 120 can forward asset reports 111 and geospatial information 141 to construction management computing system 101 via communication controller 302 while communication controller 303 can be used to convey asset reports 111 and geospatial information 141 to other assets or computing systems located at construction site 200, or to exchange data in a personal area network between components of motorized asset 120 such as display device 301, computer system 500, GNSS receiver 600, or the like. Furthermore, either of communication controllers 302 and 303 can be used to store and forward reports 150 for other assets or computing systems located at construction site 200.

In accordance with various embodiments, display device 301 may be a dedicated display with a wireless transceiver or may be part of an electronic device such as smart phone, netbook, notebook computer, tablet computer, or the like. In accordance with various embodiments, display device 301 can be removeably coupled with a docking station (not shown) which provides connection to a power source (not shown) and other components of motorized asset 120 In accordance with various embodiments, display device 301 may be a liquid crystal device, cathode ray tube, or a touch screen assembly configured to detect the touch or proximity of a user's finger, or other input device, at or near the surface of display device 301 and to communicate such an event to a processor (e.g., processors 506A, 506B, and/or 506C of FIG. 5). Display device 301 may further comprise batteries (not shown) for providing power to display device 301 when it is de-coupled from its docking station. In FIG. 3B, antenna 304 is used by communication controllers 302 and 303 for transmitting and receiving signals.

Example Non-Motorized Asset

Figure 4:
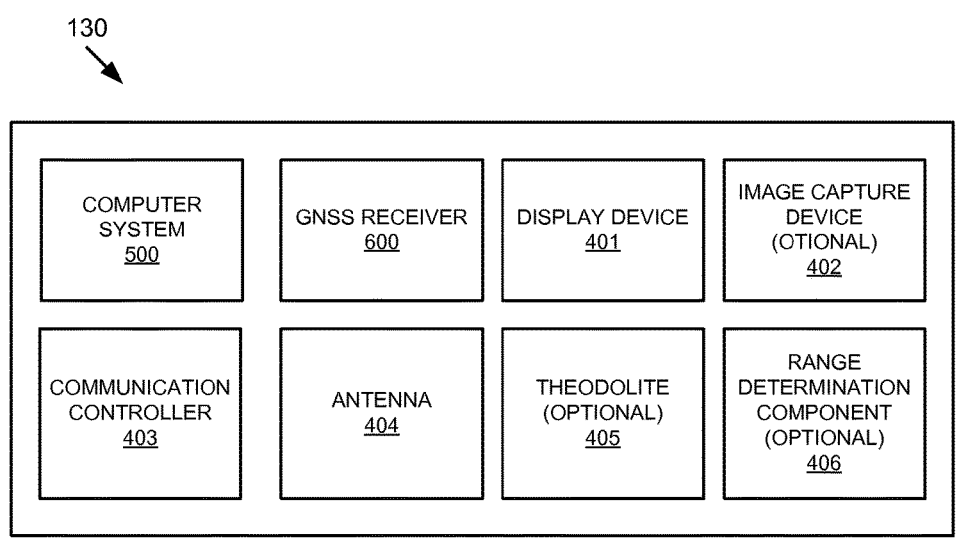
FIG. 4 is a block diagram of an example Kinematic asset management platform in accordance with various embodiments.

As described above, non-motorized assets 130 can also be used to generate asset reports 111 which convey geospatial information used by construction management computing system 101 to dynamically update real-time as-constructed model 108. FIG. 4 shows an example non-motorized asset 130 in accordance with various embodiments. In accordance with various embodiments, non-motorized asset 130 comprises a device configured to receive positioning signals 140 and to communicate geospatial information 141 via asset reports 111. Examples of non-motorized assets 130 in accordance with various embodiments include, but are not limited to, GIS data recorders, cellular telephones, laptop computers, tablet computers, surveying devices, or the like. In FIG. 4, non-motorized asset 130 comprises a computer system 500. Again, computer system 500 is discussed in greater detail below with reference to FIG. 5. Similarly, the GNSS receiver 600 shown in FIG. 4 is discussed in greater detail below with reference to FIG. 6. In FIG. 4, non-motorized asset 130 further comprises a display device 401. In accordance with various embodiments, display device 401 may be a liquid crystal device, cathode ray tube, or a touch screen assembly configured to detect the touch or proximity of a user's finger, or other input device, at or near the surface of display device 401 and to communicate such an event to a processor (e.g., processors 506A, 506B, and/or 506C of FIG. 5). In FIG. 4, non-motorized asset 130 further comprises an optional image capture device 402. In accordance with various embodiments, image capture device 402 comprises a charge-coupled device (CCD), or complementary metal-oxide semiconductor (CMOS) image sensor for capturing still or moving images. In FIG. 4, non-motorized asset 130 further comprises an optional range finder 403. In various embodiments. non-motorized asset 130 is a surveying device such as a robotic total station which may be configured with some form of range determination device such as a laser range finder. It is noted that other types of range finding devices are known in the arts such as microwave or infrared based range determination devices, sound based range determination devices, etc. In FIG. 4, non-motorized asset 130 further comprises at least one communication controller 404. For the purpose of brevity, the discussion of communication controllers with reference to FIG. 3B will not be repeated in describing embodiments of communication controller 404. It is noted that non-motorized asset 130 may comprise one or more communication controllers 404. In FIG. 4, non-motorized asset 130 further comprises an antenna 405 for facilitating sending and receiving messages by non-motorized asset 130. In FIG. 4, non-motorized asset 130 further comprises an optional theodolite 406. As described above, non-motorized asset 130 comprises a surveying instrument which is disposed at construction site 200. Theodolites are often used at construction sites to precisely position where features are emplaced at the construction site. Thus, theodolites are well suited for gathering the geospatial information of a plurality of points within construction site 200 and for reporting them to construction management computing system 101. It is noted that in various embodiments, knowledge of the height that non-motorized asset 130, more specifically antenna 632 of GNSS receiver 600) is above the ground may be necessary when sending asset report 111. In another embodiment, a rough estimate of the height of antenna 632 above the ground within an acceptable margin of error may be sufficient.

Example Computer System

Figure 5:
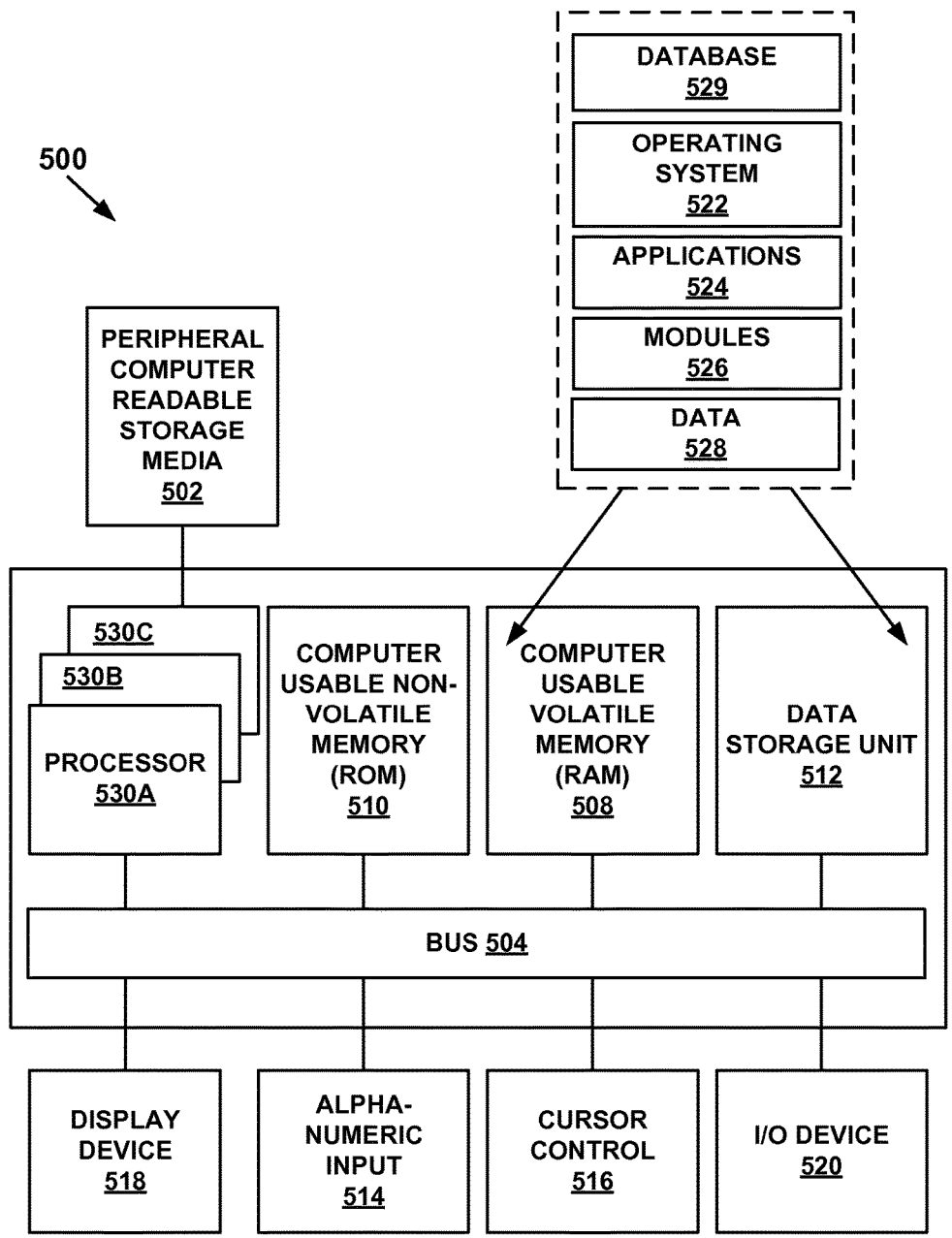
FIG. 5 is a block diagram of an example computer system used in accordance with various embodiments.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein such as construction management computing system 101, or in various embodiments of reporting device 121 and/or non-motorized asset 130. It is appreciated that computer system 500 of FIG. 5 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like. Computer system 500 of FIG. 5 is well adapted to having peripheral computer-readable storage media 502 such as, for example, a floppy disk, a compact disc, digital versatile disc, universal serial bus "thumb" drive, removable memory card, and the like coupled thereto. Furthermore, computer system 500 is well suited for use in construction management computing system 101 as well as with reporting device 121, or non-motorized asset 130.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g., random access memory (RAM), coupled to bus 504 for storing information and instructions for processors 506A, 506B, and 506C. System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. In one embodiment, system 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer readable storage media.

Example GNSS Receiver

Figure 6:
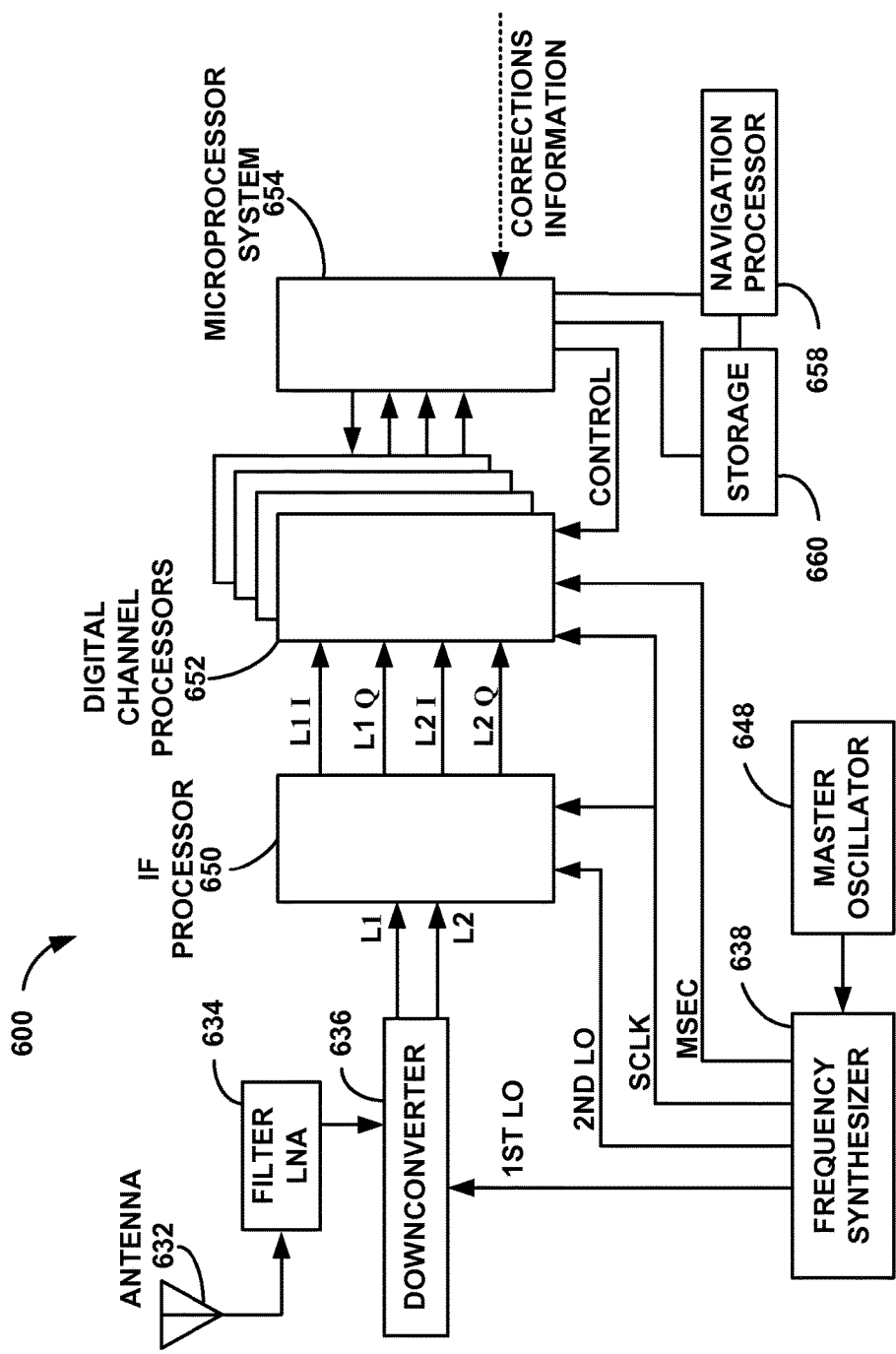
FIG. 6 is a block diagram of components of an example Global Navigation Satellite System (GNSS) receiver in accordance with various embodiments.

With reference now to FIG. 6, a block diagram is shown of an embodiment of an example GNSS receiver 600 which may be used in accordance with various embodiments described herein. In particular, FIG. 6 illustrates a block diagram of a GNSS receiver 600 in the form of a general purpose GPS receiver capable of demodulation of the L1 and/or L2 signal(s) received from one or more GPS satellites. It is noted that the components described below with reference to FIG. 6 may be performed by GNSS receivers 600 as described in FIG. 3A and FIG. 4. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Embodiments may be utilized by GNSS receivers which access the L1 signals alone, or in combination with the L2 signal(s). A more detailed discussion of the function of a receiver such as GPS receiver 280 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 280 of FIG. 6.

In FIG. 6, received L1 and L2 signal is generated by at least one GPS satellite. Each GPS satellite generates different signal L1 and L2 signals and they are processed by different digital channel processors 252 which operate in the same way as one another. FIG. 6 shows GPS signals (L1=1575.42 MHz, L2=1227.60 MHz) entering GPS receiver 280 through a dual frequency antenna 601. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GNSS receiver 600 is dictated by the performance of the filter/LNA combination. The downconverter 636 mixes both L1 and L2 signals in frequency down to approximately 175 MHz and outputs the analog L1 and L2 signals into an IF (intermediate frequency) processor 650. If processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically are identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels. Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or non-volatile storage such as a RAM or ROM, or some other computer readable memory device or media.

FIG. 7 is a flowchart of a method 700 of construction project management in accordance with one embodiment. In operation 710 of FIG. 7, parameters of a construction project design are provided to an asset at a construction site. As described above, construction management computing system 101 can assign tasks, and parameters of tasks, to assets in the field at a construction site based upon construction project design 105. In accordance with various embodiments, construction management computing system 101 can be implemented as a stand-alone device, a networked computer system, a datacenter, or in a Cloud-computing based environment. Furthermore, assets receiving parameters of construction project design 105 can be implemented as a client computer system located at the construction site.

In operation 720 of FIG. 7, geospatial information is collected by the asset while implementing parameters of the construction project at the construction site. As described above, motorized assets 120 and non-motorized assets 130 can collect geospatial information (e.g., 141 of FIG. 1) and provide that geospatial information via asset reports 111, in real-time, to construction management computing system 101. In accordance with various embodiments, the collection and reporting of the geospatial information does not comprise a dedicated function, but instead is performed while the asset is performing other tasks such as implementing the parameters provided in operation 710 above.

In operation 730 of FIG. 7, the geospatial information is provided in real-time to a construction management computing system. As described above, construction management computing system 101 receives the geospatial information 141 in real-time from various motorized (e.g., 120 of FIG. 1) and non-motorized (e.g., 130 of FIG. 1) assets at the construction site.

In operation 740 of FIG. 7, progress on the construction site design is dynamically updated in real-time by the construction management computing system 101 based on the geospatial information to create a real-time as constructed model of the construction project. As described above, construction management computing system 101 utilizes the geospatial information received from assets 120 and 130 to update construction project design 105 to generate a real-time as-constructed model 108 which reflects the actual terrain conformation at the construction site based upon real-time reporting of geospatial information. In accordance with various embodiments, real-time as-constructed model 108 can be created as an update to construction project design 105. Furthermore, real-time as-constructed model 108 can be created as a two-dimensional model of the construction site, a three-dimensional model, or a multi-dimensional model of the construction project which is modeled in more than three dimensions. It is noted that real-time as-constructed model 108 is not limited to terrain conformation alone and also comprises structures and features which are subsurface as well as above ground structures and features including, but not limited to, pipes, conduits, ditches, buildings, walls, roads, culverts, foundations, poles, and the like which are found at a construction site. In accordance with various embodiments, real-time as-constructed model 108 can be used to determine a completion level of the construction project design. For example, in one embodiment, a first value is estimated which indicates the completion of at least one of the parameters of construction project design 105. This value is compared with a second value which indicates how much of the at least one parameters of the construction project has been performed. Then, a determination of the completion level of the construction project is made based upon a comparison of the first value to the second value. Thus, if 10 kilometers of road are to be laid in a construction project, and only 3 kilometers of road have actually been laid, real-time as-constructed model 108 can determine the completion level of that operation to be 30% completed. In accordance with various embodiments, an estimate associated with the construction project design can be made using real-time as-constructed model 108. For example, using the above example of laying a road, if it has been estimated that it would take 20 days to complete laying 10 kilometers of road, and 3 kilometers have been laid in 3 days, real-time as-constructed model 108 can revise the estimate of the time to complete laying the road 7 more days based upon the real-time performance at the construction site.

In accordance with various embodiments, project work order instructions can be sent by construction management computing system 101 to a construction site within a geospatial (e.g., 2 or more dimensions) context. These instructions can be conveyed in a particular sequence, or include sequencing information, to facilitate performing the project in the most efficient manner. As discussed above, these instructions are conveyed within a geospatial context or geospatial design. The as-built data is also recorded and reported in a geospatial context and sent back to construction management computing system 101. For example, this can include, but is not limited to, operator entered notation regarding the progress of the project, or other data such as sensitive sites that should be avoided, current conditions (e.g., unexpectedly rocky terrain), the necessity for particular types of equipment, or the need to re-order work priorities. Additionally, the real-time as-constructed model 108 can be coupled with as-built records, notations, or other pertinent status updates from the field assets or staff. Furthermore, construction management computing system 101 can aggregate as-constructed data from various disparate data sources to construct real-time as-constructed model 108. For example, 2-dimensional geospatial data can be combined with 3-dimensional geospatial data to construct real-time as-constructed model 108. Additional data may comprise 2-dimensional geospatial data combined with other non-spatial parameters including, but not limited to, time, cost, mass of earthworks hauled, volume of earthworks hauled, truckloads of earthworks hauled, number of bucket loads moved, etc.

In addition, construction management computing system 101 can also revise estimates of implements which are needed to accomplish the construction project and implements which are no longer needed to accomplish the construction project. For example, if one of the assets reports the presence of a particular type of soil which currently used implements are not well suited to working with, construction management computing system 101 can determine that the currently used implements are no longer needed to accomplish the construction project. Additionally, construction management computing system 101 can determine that some other implement is needed to accomplish the construction project based upon the geospatial information conveyed in asset reports 111. Furthermore, construction management computing system 101 can determine additional tasks which are to be performed based upon the geospatial information conveyed in asset reports 111, or tasks which are no longer necessary. As discussed above, construction management computing system 101 can provide revised parameters to an asset based upon real-time as-constructed model 108. For example, if 1 meter of soil is to be removed from a location based upon construction project design 105, and geospatial information from a motorized asset 120 indicates that 30 centimeters of soil have been removed, construction management computing system 101 can send revised parameters (e.g., via a report 150) to that motorized asset indicating that 70 centimeters of soil are to be removed from that location. In addition, the revised parameters can be sent to a second asset (e.g., a second motorized asset 120) which may also be working at the location to accomplish the same task.

Embodiments of the present technology are thus described. While the present technology has been described in particular embodiments, it should be appreciated that the present technology should not be construed as limited to these embodiments alone, but rather construed according to the following claims.

What is claimed is:

1. A method of construction project management, comprising:
   providing parameters of a construction project design to a motorized asset at a construction site, said construction project design including a plurality of features, wherein said motorized asset comprises a Global Navigation Satellite System (GNSS) receiver configured to receive positioning signals and a reporting device configured to receive said parameters;
   collecting, by said motorized asset, geospatial information of an unanticipated feature while implementing said parameters of said construction project design at said construction site, wherein said construction project design does not include said unanticipated feature;
   providing said geospatial information of said unanticipated feature to a construction management computing system, wherein said construction management computing system is remote from said motorized asset;
   identifying, by said construction management computing system, at least one feature of said plurality of features having a location corresponding to said geospatial information of said unanticipated feature;
   re-routing, by said construction management computing system, said construction project design around said unanticipated feature by creating an updated construction project design, wherein said location of said at least one feature is moved to a new location within said updated construction project design such that said new location does not correspond to said geospatial information of said unanticipated feature;
   generating at least one new parameter corresponding to one or more tasks, wherein said one or more tasks include:
      removing soil surrounding said unanticipated feature;
      while removing said soil surrounding said unanticipated feature, collecting additional geospatial information for providing an indication of how much soil has been removed;
      removing said unanticipated feature such that a hole is created; and
      filling said hole with additional soil; and
   sending updated parameters of said updated construction project design to said motorized asset at said construction site, causing said motorized asset to implement said updated parameters.

2. The method of claim 1, further comprising:
   using said updated construction project design to determine a completion level of said construction project design.

3. The method of claim 2, further comprising:
   estimating a first value indicating the completion of at least one of the parameters of said construction project design;
   comparing said first value with a second value indicating how much of the at least one of the parameters of said construction project design has been performed; and
   determining said completion level of said construction project design based upon the comparison of said first value to said second value.

4. The method of claim 1, further comprising:
   using said updated construction project design to revise an estimate associated with said construction project design.

5. The method of claim 4, further comprising:
   revising said estimate to indicate an implement needed to accomplish said construction project design; and
   revising said estimate to indicate an implement no longer needed to accomplish said construction project design.

6. The method of claim 4, further comprising:
   revising said estimate to indicate at least one task to be performed to implement said construction project design.

7. The method of claim 1, further comprising:
   providing revised parameters to said motorized asset based upon said updated construction project design.

8. The method of claim 1, wherein said updated construction project design indicates that an area encompassing said unanticipated feature is off-limits.

9. The method of claim 1, wherein said motorized asset comprises a bulldozer.

10. The method of claim 1, wherein said motorized asset comprises a truck.

11. The method of claim 1, further comprising:
    creating a real-time, as-constructed two-dimensional model of said updated construction project design.

12. The method of claim 1, further comprising:
    creating a real-time, as-constructed three-dimensional model of said updated construction project design.

13. The method of claim 1, further comprising:
    creating a real time, as-constructed multi-dimensional model of said updated construction project design, wherein said multi-dimensional model is modeled in more than three-dimensions.

14. The method of claim 1, further comprising:
    creating a plurality of multi-dimensional models of said construction site based upon a plurality of reports from a plurality of assets including said motorized asset, wherein each of said plurality of reports comprises geospatial information in at least two dimensions; and
    aggregating said plurality of multi-dimensional models of said construction site to create a real-time as-constructed model.

15. The method of claim 14 wherein said creating said plurality of multi-dimensional models further comprises:
    creating at least one multi-dimensional model based upon an asset report comprising geospatial information in at least two dimensions and further comprising at least one non-spatial parameter.

16. The method of claim 1, further comprising:
    creating said updated construction project design as an update to a source model from which said parameters were derived.

17. The method of claim 1, further comprising:
    implementing said construction management computing system as a cloud-based construction management computing system.

18. The method of claim 17, further comprising:
    sending said updated construction project design to a client computer system located at said construction site.

19. A non-transitory computer-readable storage medium comprising computer executable code for directing a processor to execute a method of construction project management, the method comprising:
    providing parameters of a construction project design to a motorized asset at a construction site, said construction project design including a plurality of features, wherein said motorized asset comprises a Global Navigation Satellite System (GNSS) receiver configured to receive positioning signals and a reporting device configured to receive said parameters;

collecting, by said motorized asset, geospatial information of an unanticipated feature while implementing said parameters of said construction project design at said construction site, wherein said construction project design does not include said unanticipated feature;

providing said geospatial information of said unanticipated feature to a construction management computing system, wherein said construction management computing system is remote from said motorized asset;

identifying, by said construction management computing system, at least one feature of said plurality of features having a location corresponding to said geospatial information of said unanticipated feature;

re-routing, by said construction management computing system, said construction project design around said unanticipated feature by creating an updated construction project design, wherein said location of said at least one feature is moved to a new location within said updated construction project design such that said new location does not correspond to said geospatial information of said unanticipated feature;

generating at least one new parameter corresponding to one or more tasks, wherein said one or more tasks include:
removing soil surrounding said unanticipated feature;
while removing said soil surrounding said unanticipated feature, collecting additional geospatial information for providing an indication of how much soil has been removed;
removing said unanticipated feature such that a hole is created; and
filling said hole with additional soil; and sending updated parameters of said updated construction project design to said motorized asset at said construction site, causing said motorized asset to implement said updated parameters.

20. The non-transitory computer-readable storage medium of claim 19, wherein said method further comprises:
using said updated construction project design to determine a completion level of said construction project design.

21. The non-transitory computer-readable storage medium of claim 20, wherein said method further comprises:
estimating a first value indicating the completion of at least one of the parameters of said construction project design;
comparing said first value with a second value indicating how much of the at least one of the parameters of said construction project design has been performed; and
determining said completion level of said construction project design based upon the comparison of said first value to said second value.

22. The non-transitory computer-readable storage medium of claim 19, wherein said method further comprises:
using said updated construction project design to revise an estimate associated with said construction project design.

23. The non-transitory computer-readable storage medium of claim 22, wherein said method further comprises:
revising said estimate to indicate an implement needed to accomplish said construction project design; and
revising said estimate to indicate an implement no longer needed to accomplish said construction project design.

24. The non-transitory computer-readable storage medium of claim 22, wherein said method further comprises:
revising said estimate to indicate at least one task to be performed to implement said construction project design.

25. The non-transitory computer-readable storage medium of claim 19, wherein said method further comprises:
providing revised parameters to said motorized asset based upon said updated construction project design.

26. The non-transitory computer-readable storage medium of claim 19, wherein said updated construction site design indicates that an area encompassing said unanticipated feature is off-limits.

27. The non-transitory computer-readable storage medium of claim 19, wherein said motorized asset comprises a bulldozer.

28. The non-transitory computer-readable storage medium of claim 19, wherein said motorized asset comprises a truck.

29. The non-transitory computer-readable storage medium of claim 19, wherein said method further comprises:
creating a real-time, as-constructed two-dimensional model of said updated construction project design.

30. The non-transitory computer-readable storage medium of claim 19, wherein said method further comprises:
creating a real-time, as-constructed three-dimensional model of said updated construction project design.

31. The non-transitory computer-readable storage medium of claim 19, wherein said method further comprises:
creating a real time, as-constructed multi-dimensional model of said updated construction project design, wherein said multi-dimensional model is modeled in more than three-dimensions.

32. The non-transitory computer-readable storage medium of claim 19, wherein said method further comprises:
creating said updated construction project design as an update to a source model from which said parameters were derived.

33. The non-transitory computer-readable storage medium of claim 19, wherein said method further comprises:
implementing said construction management computing system as a cloud-based construction management computing system.

34. The non-transitory computer-readable storage medium of claim 33, wherein said method further comprises:
sending said updated construction project design to a client computer system located at said construction site.

35. The non-transitory computer-readable storage medium of claim 19, wherein said dynamically updating progress on said construction site design in real-time based on said geospatial information to create a real-time as-constructed model of said construction project comprises:
creating a plurality of multi-dimensional models of said construction site based upon a plurality of reports from a plurality of assets including said motorized asset, wherein each of said plurality of reports comprises geospatial information in at least two dimensions; and aggregating said plurality of multi-dimensional models of said construction site to create a real-time as-constructed model.

36. The non-transitory computer-readable storage medium of claim 35 wherein said creating said plurality of multi-dimensional models further comprises:
creating at least one multi-dimensional model based upon an asset report comprising geospatial information in at least two dimensions and further comprising at least one non-spatial parameter.

37. A system comprising:
a motorized asset comprising:
a Global Navigation Satellite System (GNSS) receiver configured to receive positioning signals;
a reporting device configured to receive parameters of a construction project design, said construction project design including a plurality of features, wherein said motorized asset is configured to collect geospatial information of an unanticipated feature while implementing said parameters of said construction project design at a construction site, wherein said construction project design does not include said unanticipated feature;
a construction management computing system for construction project management, comprising:
a memory; and
a processor coupled with said memory, said processor configured to perform operations including:
providing said parameters of said construction project design to said motorized asset at said construction site;
receiving said geospatial information of said unanticipated feature from said motorized asset, wherein said construction management computing system is remote from said motorized asset;
identifying at least one feature of said plurality of features having a location corresponding to said geospatial information of said unanticipated feature;
re-routing said construction project design around said unanticipated feature by creating an updated construction project design, wherein said location of said at least one feature is moved to a new location within said updated construction project design such that said new location does not correspond to said geospatial information of said unanticipated feature;
generating at least one new parameter corresponding to one or more tasks, wherein said one or more tasks include:
removing soil surrounding said unanticipated feature;
while removing said soil surrounding said unanticipated feature, collecting additional geospatial information for providing an indication of how much soil has been removed;
removing said unanticipated feature such that a hole is created; and
filling said hole with additional soil; and
sending updated parameters of said updated construction project design to said motorized asset at said construction site, causing said motorized asset to implement said updated parameters.

38. The system of claim 37, wherein said processor is further configured to use said updated construction project design to determine a completion level of said construction project design.

39. The system of claim 38, wherein said processor is further configured to estimate a first value indicating the completion of at least one of the parameters of said construction project design, and to compare said first value with a second value indicating how much of the at least one of the parameters of said construction project design has been performed to determine said completion level of said construction project design based upon the comparison of said first value to said second value.

40. The system of claim 37, wherein said processor is further configured to use said updated construction project design to revise an estimate associated with said construction project design.

41. The system of claim 40, wherein said processor is further configured to revise said estimate to indicate an implement needed to accomplish said construction project design and to indicate an implement no longer needed to accomplish said construction project design.

42. The system method of claim 40, wherein said processor is further configured to revise said estimate to indicate at least one task to be performed to implement said construction project design.

43. The system of claim 37, wherein said construction management computing system further comprises a communication component configured to send said updated parameters to said motorized asset.

44. The system of claim 37, wherein said updated construction project design indicates that an area encompassing said unanticipated feature is off-limits.

45. The system of claim 37, wherein said motorized asset comprises a bulldozer.

46. The system of claim 37, wherein said motorized asset comprises a truck.

47. The system of claim 37, wherein said processor is further configured to create a real-time, as-constructed two-dimensional model of said updated construction project design.

48. The system of claim 37, wherein said processor is further configured to create a real-time, as-constructed three-dimensional model of said updated construction project design.

49. The system of claim 37, wherein said processor is further configured to create a real time, as-constructed multi-dimensional model of said updated construction project design.

50. The system of claim 37, wherein said processor is further configured to create said updated construction project design as an update to a source model from which said parameters were derived.

51. The system of claim 37, further comprising:
a client computer system located at said construction site and configured to receive said updated construction project design.

52. The system of claim 37, wherein said processor is further configured to create a plurality of multi-dimensional models of said construction site based upon a plurality of reports from a plurality of assets including said motorized asset, wherein each of said plurality of reports comprises geospatial information in at least two dimensions and to aggregate said plurality of multi-dimensional models of said construction site to create a real-time as-constructed model.

53. The system of claim 52 wherein said processor is further configured to create at least one multi-dimensional model based upon an asset report comprising geospatial information in at least two dimensions and further comprising at least one non-spatial parameter.

\* \* \* \* \*